United States Patent

[11] 3,629,695

[72] Inventors: Jefferson H. Taylor, Dallas; James J. Jones, Plano, both of Tex.
[21] Appl. No.: 846,546
[22] Filed: July 31, 1969
[45] Patented: Dec. 21, 1971
[73] Assignee: Texas Instruments Incorporated, Dallas, Tex.

[54] PRERECORDED ELECTRONIC TAPE CONTROLLED CIRCUIT TESTING SYSTEM UTILIZING DIGITAL SIGNAL LOGIC
10 Claims, 5 Drawing Figs.

[52] U.S. Cl. ................................................ 324/57 R, 324/73
[51] Int. Cl. ........................................................ G01r 31/00
[50] Field of Search ........................................ 324/73, 57, 57 NB

[56] References Cited
UNITED STATES PATENTS
3,522,532   8/1970   McCoy .......................... 324/73

FOREIGN PATENTS
1,168,150   10/1969   Great Britain ................ 324/73

Primary Examiner—Alfred E. Smith
Attorneys—James O. Dixon, Andrew M. Hassell, Harold Levine, Melvin Sharp, John E. Vandigriff, Henry T. Olsen and Michael A. Sileo, Jr.

ABSTRACT: The operation of an electronic circuit is checked by prerecorded waveforms that are converted into electrical signals. One of the electrical signals resulting from the processing of the prerecorded waveforms is connected to the input terminal of the circuit being checked. Another of the prerecorded waveforms is processed into a check signal and subsequently characterized into individual synchronizing pulses. A reject indicator, which includes switching circuitry operatively responsive to the check signals and the output from the circuit being tested, is energized to indicate when a circuit does not perform to certain operational specifications.

3,629,695

INVENTORS:
JAMES J. JONES
JEFFERSON H. TAYLOR

INVENTORS:
JAMES J. JONES
JEFFERSON H. TAYLOR

PRERECORDED ELECTRONIC TAPE CONTROLLED CIRCUIT TESTING SYSTEM UTILIZING DIGITAL SIGNAL LOGIC

This invention relates to circuit testing, and more particularly to circuit testing by means of prerecorded test waveforms.

In the manufacture of electronic circuits, or after repair, the operation thereof must be checked to determine if it conforms to a desired operational specification. Heretofore, such circuitry was tested using complicated and sophisticated electronic instrumentation which required an operator having a high level of expertise. In addition to the cost involved for the sophisticated instrumentation, and the labor cost of a technician, previous test procedures require considerable time for testing each individual circuit. Further, previous techniques required a certain amount of judgment for making an "accept" or "reject" decision by the technician. Thus, earlier electronic circuit testing techniques required expensive equipment, a highly trained technician, a considerable amount of time and an operator decision.

To check the operation of electronic circuitry, it is an object of this invention to provide inexpensive test apparatus. Another object of this invention is to provide apparatus for testing electronic circuitry with prerecorded waveforms. A further object of this invention is to provide for testing electronic circuitry which gives a "go" or "no go" indication. A still further object of this invention is to provide for electronic circuit testing with relatively simple test apparatus.

In accordance with this invention, at least one of several prerecorded waveforms are processed into an input signal to be connected to the electronic circuit to be tested. A reject indicator operatively responds to the output of the tested electronic circuitry and gives "go" or "no go" indications when the tested circuit operation does or does not conform as the case may be, to a desired operational specification as determined by a check waveform.

In accordance with a more specific embodiment of the invention, a magnetic tape player processes prerecorded test waveforms on a magnetic tape into an input signal to be connected to an electronic circuit under test. Likewise, the magnetic tape player processes one of the prerecorded waveforms into a check signal. This check signal is further characterized into individual signals that are used to determine if the tested circuit operates in a manner as established in an operational specification. The individual check signals are connected as one input to individual switching circuits. Each of the individual switching circuits also operatively responds to the output of the circuit under test. When both the check signal and the output of the tested circuit to an individual switch have a certain preordered relationship, the circuit under test will be operating in accordance with a desired specification. On the other hand, if a predetermined relationship does not exist at a particular switch, a reject indicator will be energized to flash a warning that the circuit is functioning improperly.

A more complete understanding of the invention and its advantages will be apparent from the specification and claims and from the accompanying drawings illustrative of the invention.

Referring to the drawings.

Figure 1:
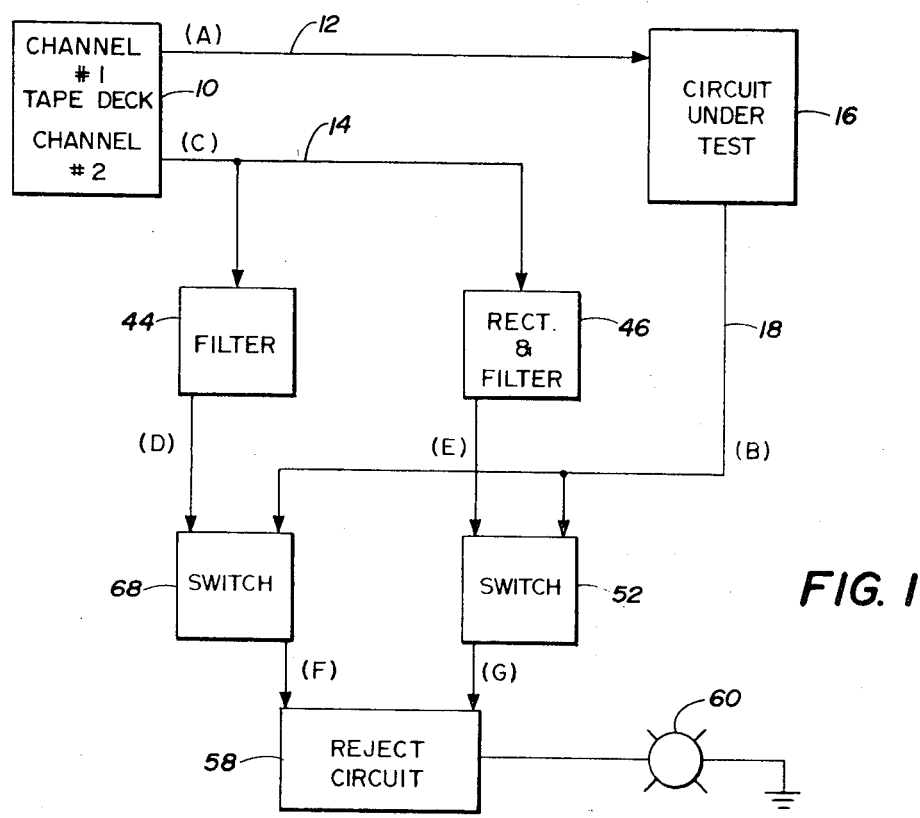
FIG. 1 is a block diagram of an electronic circuit testing system using prerecorded waveforms on magnetic tape.

Referring to FIG. 1, prerecorded test waveforms (e.g., waveforms recorded on magnetic tape) are processed through a play back device 10, i.e., a tape deck, to produce a test signal on a line 12 and a check function signal on a line 14. Although magnetic tape is utilized in this embodiment for storing the test waveforms, and this description will emphasize the use of magnetic tape, other embodiments utilize other means of reproducing waveforms, such as recording disks or cylinders, optical film recordings, or magnetic wire recordings. The test waveforms are recorded on a single channel or multiple channels. Use of a single channel recording requires either multiplexing a test waveform or selecting frequencies such that the test signal on line 12 would not interfere with the check function signal on line 14. For the majority of circuits to be tested, a conventional stereo tape player will be adequate for the tape deck 10; however, for sophisticated circuit testing, an instrumentation quality recorder would be required. One application that requires the use of an instrumentation quality recorder is in the testing of wide-band audio-type amplifiers over a wide frequency range.

A recorded waveform processed into a test signal on line 12 connects as the input to a circuit 16 being tested. It should be understood, that some tested circuits require multiple inputs, and in such cases, a plurality of test signals are generated on the line 12. To describe the present invention, an example of a circuit to be tested is that used in an automobile skid control module. Briefly, a vehicle skid control system includes wheel speed sensors generating a signal varying in frequency in accordance with wheel speed. These frequency signals are inputs to a skid control module that produces an output pulse that energizes a solenoid to interrupt the normal braking operation of an automobile when a skid is imminent. The skid control module supplies an output signal that automatically pumps or pulses the rear wheel brakes of a vehicle in an arbitrary preprogrammed manner. Thus, for purposes of this explanation, the circuit 16 will be considered to be the skid control module having an input signal on line 12 that varies in frequency and an output signal on line 18 that is a series of pulses.

In the operation of a skid control module, the frequency varying signals generated at rear wheel sensors are converted in square wave generators in DC voltages that are averaged in a summing amplifier to produce inputs to a deceleration rate detector and an acceleration rate detector. The deceleration rate detector generates a brake inhibit signal to a brake controller whenever the deceleration rate of the rear wheels reaches a set limit. The acceleration rate detector also generates a brake inhibit signal to the brake controller. To inhibit normal brake control when a skid is imminent, the control module energizes a solenoid when all inputs to the brake controller are at a brake inhibit level. Before all inputs to the brake controller will be at a brake inhibit level, a variable speed switch drives one of the inputs to the brake inhibit level. The variable speed switch generates the necessary signal whenever three input signals thereto satisfy preset conditions and the switch itself is not inhibited from operating.

With the braking action inhibited, the rear wheels begin to spin-up to the speed of the vehicle. When the rate of rear wheel acceleration reaches the preset level in the acceleration rate detector, the detector trips and one input to the brake controller changes to a normal braking level. This causes the solenoid to be deenergized and hydraulic pressure is reapplied to the rear wheels. In some situations, the rear wheel spin-up will not reach the acceleration rate detector set point. In these cases, after a preset time, the output of the deceleration rate detector returns to the normal braking level, thereby deenergizing the control solenoid and reapplying hydraulic pressure to the rear wheels. Thus, there are three main components to be checked in a skid control module. Namely, the turn-on and turnoff of the deceleration rate detector, the turnoff of the acceleration rate detector and the operation of the speed switch. These three major components are easily checked with prerecorded test waveforms.

Figure 2:
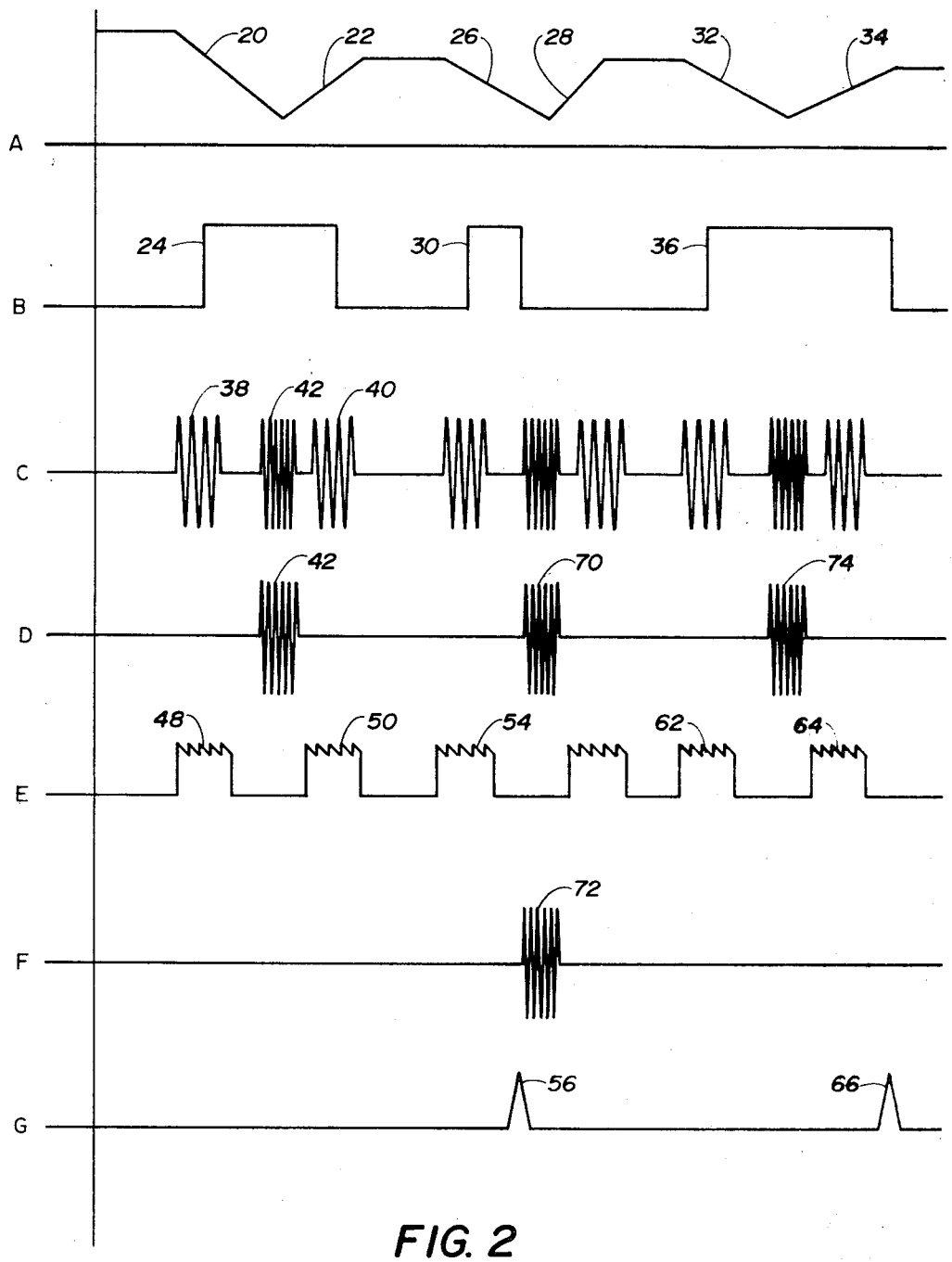
FIG. 2 is an illustration of seven waveforms for testing a particular electronic circuit with the system of FIG. 1.

Referring to FIG. 2, the input signal to a skid control circuit 16 is a signal (not illustrated) varying in frequency. Initially, a steady frequency signal, as illustrated by curve A, is applied to the input of the circuit. After the initial period, the input frequency varies as along the ramp 20 and then increases as along the ramp 22. With the skid control circuit operating in accordance with an established specification, when the rate of frequency decrease along the ramp 20 reaches a preset level, an output pulse appears on the line 18 as illustrated by curve B of FIG. 2. An output pulse continues to be present on line 18 until the rate of frequency increases along the ramp 22 and reaches a preset level, or a given time interval has expired. The square wave pulse 24 of FIG. 2 illustrates the output of a skid control module operating in accordance with a desired operational specification.

After a second period of steady frequency to the circuit 16, a second decreasing frequency signal is applied to the input. Since the circuit 16 contains several components that function to produce a brake control signal, a complete test of the circuit includes checks that are intended to determine the operation of each of the various components. The first test may check the operation of the deceleration rate detector, and the second test, indicated by the decrease in frequency along the ramp 26 and the increase in frequency along the ramp 28, may check the operation of the speed switch. For normal operation, an output pulse on the line 18 similar to that illustrated at 24 should appear. However, as illustrated at 30, only an abbreviated pulse appears. After a third period of steady frequency, another decreasing and increasing frequency signal will be generated on the line 12 as an input to the circuit 16 as illustrated by the ramps 32 and 34. This third test may determine if the control circuit turns off within a preset time after the frequency begins to increase as along the ramp 34. As illustrated by the curve at FIG. 2E, the output pulse 36 appears at the correct time with respect to the ramp 32, but continues past the normal turnoff time into a period of fixed frequency.

Heretofore, the skid control module for a brake inhibit system would be checked by means of a precision DC ramp generator and a programmable frequency synthesizer to generate the input frequency varying wave. To determine if the circuit operated properly, the output would be required to be displayed on a storage-type oscilloscope which must be interpreted by an operator. Although an operator may easily determine that the pulse 24 illustrates correct operation and the pulse 30 indicates improper operation, a judgment decision would be required to say whether or not the pulse 36 illustrated correct or incorrect operation. In accordance with the present invention, the pulse output of the circuit on line 18 is checked automatically by means of the check function signal generated on the line 14.

To check a circuit having an output that must appear at a given time with relation to an input signal and be turned off when the input satisfies a second set of conditions, a check function signal as illustrated by the curve at FIG. 2C is generated on the line 14. This function must be synchronized with various frequency changes of the input signal on the line 12. Each group of signals of curve C of FIG. 2 consists of two relatively low-frequency signals with a high-frequency signal interposed between. Considering the first group illustrated, the low-frequency signals 38 and 40, e.g., 1.3 kHz., are synchronized with the ramps 20 and 22, respectively, to check the on and off time of the pulse 24. The high-frequency signal 42, for example, 3.0 kHz. interposed between the signals 38 and 40, is employed to check whether the pulse 24 is continuous between the on and off times.

The check function signal as illustrated in FIG. 2C and appearing on line 14 connects to the input of a low-frequency filter 44 and a high-frequency filter 46. Filter 44 attenuates the signals 38 and 40 and passes the high-frequency signal 42 to produce a check signal as illustrated by the curve of FIG. 2D. Filter 46, on the other hand, attenuates the signal 42 and passes the signals 38 and 40. In addition to filtering the signal on line 14, the filter 46 also rectifies the signals 38 and 40 to synthesize pulses 48 and 50, as illustrated at FIG. 2E.

Considering first the filter 46 and the check signal illustrated at FIG. 2E, this series of synthesized pulses is one input to a switch 52 having a second input tied to the line 18. Thus, the switch 52 has as inputs the signals illustrated at FIG. 2B and FIG. 2E. Switch 52 may be considered analogous to a logic "NAND" gate wherein if the two input signals have a preset relationship, then one output will appear and if this relationship does not exist, a second output will appear.

The output of the switch 52 will initially be zero as illustrated by the curve at FIG. 2G. At this time, the inputs as illustrated at both FIGS. 2B and 2E will also be zero. The first input signal to appear at the switch 52 will be the pulse 48. This pulse along does not produce an output from the switch. As the frequency to the circuit 16 decreases along the ramp 20, the pulse 24 next appears as an input to the switch 52. This pulse is differentiated and rectified in the switch to produce a series of spikes that correspond to the leading and trailing edges thereof. At the time the leading edge of the pulse 24 appears at the input to the switch 52, the pulse 48 is also present and the output of the switch remains zero. Next, the pulse 50 appears as an input to the switch 52 and a spike corresponding to the trailing edge of the pulse 24 establishes the required relationship to hold the output of the switch 52 at zero.

For the second test of the circuit 16 as indicated by the ramps 26 and 28, a pulse 54 is generated by the filter 46 as one input to the switch 52. The leading edge of the pulse 30 appears during the presence of the pulse 54 to hold the output of the switch 52 at zero. Note, however, that the pulse 30 is short and produces a trailing edge spike at a time when the second input to the switch 52 is zero. With this set of input conditions to the switch 52, which indicates a malfunction of the circuit 16, a pulse 56 will appear at the output of the switch and energize a reject circuit 58 that turns on an indicator light 60. When the indicator 60 is turned on, the operator immediately recognizes that the circuit 16 is not functioning properly. By knowing what test is being performed, the operator can also pinpoint that component of the circuit that is most likely causing the malfunction.

Additional tests of the circuit 16 will determine if any other components are malfunctioning. The next test, indicated by the ramps 32 and 34, produces an output pulse 36 on the line 18. The leading edge of the pulse 36 appears at a time when the pulse 62 is generated by the filter 46 to the switch 52. This prevents the leading edge spike of the pulse 36 from energizing the reject circuit 58. The third test is concluded when the test signal on line 12 has a fixed frequency. However, the circuit 16 continues to produce an output pulse on line 18. This pulse has a duration such that it produces a trailing edge spike outside the envelope of the check pulse 64. Thus, the trailing edge spike of the pulse 36 produces a pulse 66, illustrated at FIG. 2G, to energize the reject circuit 58 and turn on the indicator 60. The operator is again notified that the circuit 16 does not operate in accordance with an established specification.

In addition to checking whether the output of the circuit 16 turns on and off at the proper time, the system of FIG. 1 also checks to determine if the output pulse is continuous between the leading and trailing edges thereof. To run this additional test, the high-frequency portion of the check function signal, as illustrated at FIG. 2C, that is, pulse 42, is passed by the filter 44 as one input to a switch 68. The switch 68 operates in a manner similar to the switch 52, except in the reverse order. Switch 52 produced a reject signal if the output of the circuit 16 changes at a time when no check pulse appears at the filter 46. The switch 68, on the other hand, generates a reject signal if the check function passed by the filter 44 appears at an input when the output of the circuit 16 is zero. During the presence of the pulse 24 at the switch 68 from the circuit 16, both the test function signal 42 and the pulse 24 are present at inputs to the switch. This indicates a continuous pulse on line 18 and the output of the switch 68 will be zero as illustrated by the curve of FIG. 2F.

Testing of the circuit 16 continues and pulse 30 is generated at the output. Pulse 30 is an abbreviated pulse that terminates before the check function signal 70 is passed by the filter 44 to one input to the switch 68. Thus, at this time only the check function 70 is connected to the inputs of the switch 68 and a reject signal 72 will be generated to energize the reject circuit 58 and turn on the indicator 60. Turning on the indicator 60 will indicate to an operator that not only did the pulse 30 produce a spike in the switch 52 at the wrong time, but also that pulse 30 did not continue for the correct duration. Thus, turning on the indicator light 60 as a result of the reject signal 56 and subsequently turning on the indicator as a result of the reject signal 72, the operator knows the pulse 30 is short.

For the third test, the pulse 36 will be present at the input to the switch 68 when the check function signal 74 is passed through the filter 44. This holds the output of the switch 68 at zero, thereby preventing energization of the reject circuit 58.

After completion of the three tests on the circuit 16, an operator will have determined if the circuit has performed in accordance with an established operational specification. It should be understood that a complete test cycle for any particular circuit may vary considerably from that described above. Even for the skid control module, it may be desirable to produce changes in signal amplitude while the frequency changes are occuring, or it may be desirable to produce amplitude changes at the constant frequency times. These amplitude changes can be of a linear ramp, step function or complex function nature depending upon the characteristic desired. In testing certain amplifier circuitry, it may be desirable to introduce noise signals either alone or in combination with other previously described signals. All these conditions may be tested by utilization of prerecorded test waveforms that are processed to produce input signals to the test circuitry. Combinations of the various test cycles, previously described, may follow each other during a test program to assure proper operation of a given electronic circuit under varying conditions of input signals. In all cases, by choosing the proper check function, a reject signal will be generated to energize the reject circuit 58 to turn on the indicator 60 when a circuit under test does not operate properly. The indicator 60 provides a simple "go" or "no go" indication which does not require judgment on the part of an operator to determine if a given electronic circuit is operating properly.

Figure 3:
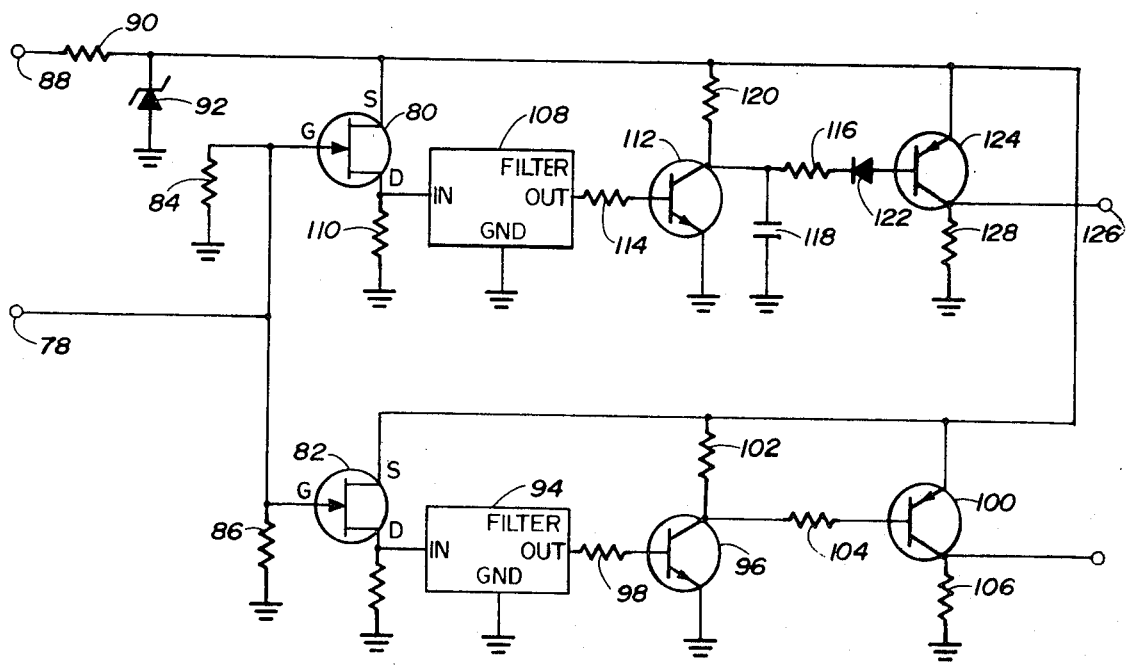
FIG. 3 is a schematic of a filter circuit for testing electronic circuits having periodically appearing output pulses.

Referring to FIG. 3, there is shown a schematic incorporating the filters 44 and 46 of FIG. 1. The check function waveform illustrated at FIG. 2C connects by means of an input terminal 78 to the gate electrode of field-effect transistors 80 and 82. A base resistor 84 also connects to the gate of the field-effect transistor 80 and a base resistor 86 connects to the gate of the field-effect transistor 82. A DC voltage at the terminal 88 supplies a source drive voltage to the transistors 80 and 82. Resistor 90 and a Zener diode 92 establish the source drive voltage level.

In effect, the circuit of FIG. 3 comprises two independent systems having a common signal source and a common drive voltage. The field-effect transistor 82 is part of the filter network 44. An output voltage at the drain electrode of the transistor 82 is established across a resistor 96 and connects to the input of a filter circuit 94. The input wave to the filter 94 will be groups of frequency signals as illustrated in FIG. 2C and an output from the filter 94 will be the frequency signal illustrated at FIG. 2D. These short bursts of high-frequency signals are connected to the base electrode of a transistor 96 through a base drive resistor 98. Transistor 96 provides amplification of the filter output which is further amplified by a transistor 100. A circuit for the transistor 96 includes an output resistor 102 and a circuit for the transistor 100 includes a base drive resistor 104. An output signal at the base electrode of the transistor 100 connects to the switching circuit 58. The base electrode circuit includes a resistor 106. At the output of the transistor 100 a series of high-frequency signals will be generated as illustrated in FIG. 2D.

The check function signal illustrated at FIG. 2C is also amplified by the transistor 80 which has an output connected to an input of a filter 108. A resistor 110 connected to the drain of the transistor 80 establishes the filter input level. An output from the filter 108 includes the two outer frequency pulses of the signal groups illustrated at FIG. 2C. These frequency signals are connected to the base electrode of a transistor 112 through a base drive resistor 114. After amplification in the transistor 112, signals passed by the filter 108 are connected to a ripple smoothing RC-circuit including a resistor 116 and a capacitor 118. The drive circuit of the transistor 112 includes a collector resistor 120. In series with the resistor 116 is a diode 122 for rectifying the pulses passed by the filter 108 into a series of negative pulses. The negative pulses produced by the diode 122 are amplified by a transistor 124 and appear as a train of positive only pulses at an output terminal 126 which connects to the switch 52 of FIG. 1. This signal train is illustrated at FIG. 2E. The magnitude of the pulses generated at the transistor 124 will be determined by a resistor 128 connected to the collector electrode.

In operation, a check function signal of the type illustrated at FIG. 2C is connected to the input terminal 78. After amplification by the transistor 82, the low-frequency sections of the function are filtered by the circuit 94 which passes only the high-frequency section. The high-frequency check signal is amplified by the transistors 96 and 100 to produce one input to the switch 58. Similarly, the transistor 80 amplifies the check function signal connected to the terminal 78. The filter 108 attenuates the high-frequency section and passes only the low-frequency pulses which are amplified by a transistor 112. After rectification by the diode 122, the low-frequency pulses are amplified by the transistor 127 to produce one input to the switch 52. Thus, the check function signal is characterized into individual check signals. The check signal at the output of the transistor 100 is illustrated at FIG. 2D and the check signal at the output of the transistor 124 is illustrated at FIG. 2E.

Figure 4:
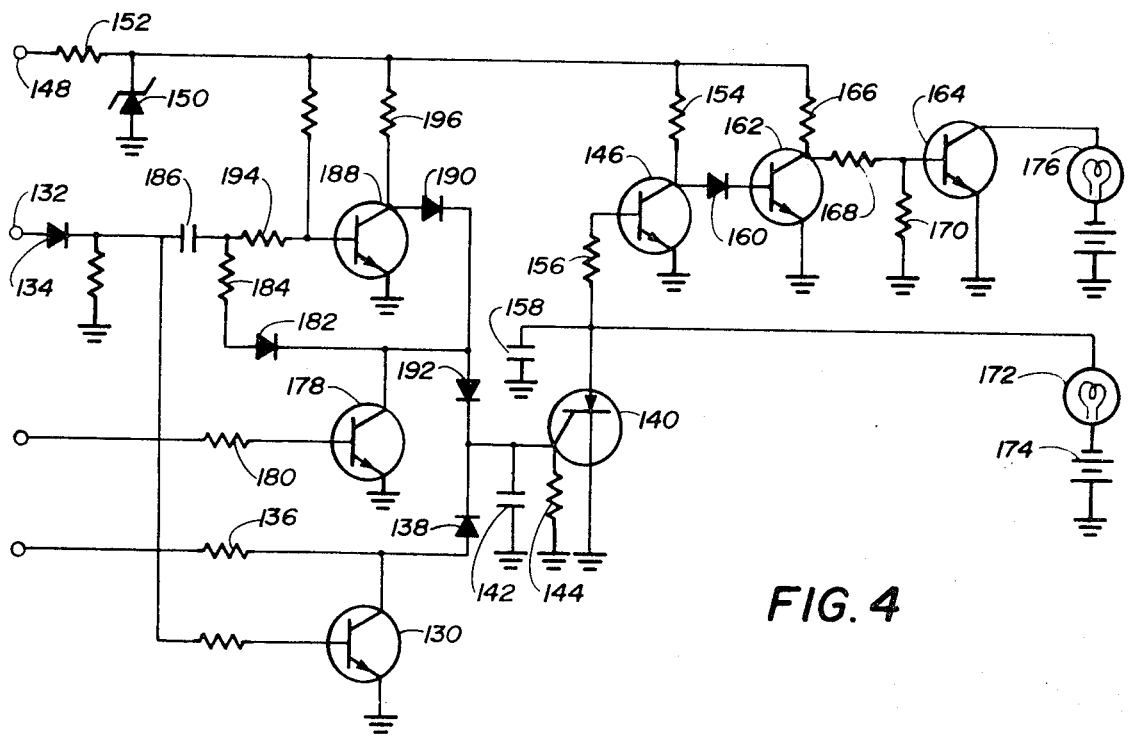
FIG. 4 is a schematic of a switching and reject circuit for the system illustrated in FIG. 1.

Referring to FIG. 4, there is shown a schematic of a circuit that combines the function of the switches 52 and 68 and the reject circuit 58. Switch 68 is represented in FIG. 4 by a transistor 130 having a base electrode connected to an input terminal 132 through a blocking diode 134. The high-frequency check signal, i.e., pulse 42 of FIG. 2D, generated at the output of the transistor 100 is connected to the collector electrode of the transistor 130 through a resistor 136. Also connected to the collector electrode of the transistor 130 is a blocking diode 138.

Whenever an output pulse from the module 16, for example pulse 24 illustrated at FIG. 2B, is connected to the input terminal 132, the transistor 130 will be conducting thereby clamping the collector electrode to ground. Clamping the collector electrode of the transistor 130 to ground prevents the high-frequency pulse 42 from forward biasing the diode 138. Thus, if an output pulse is present from the module 16, the high-frequency check signal 42 will be blocked from passing through the diode 138.

On the other hand, if an output pulse from the module 16 is not present when the high-frequency check signal is amplified by the transistor 100, this signal will forward bias the diode 138 thereby connecting a positive voltage to the gate electrode of a silicon controlled rectifier (SCR) 140. The gate electrode circuit for the SCR 140 includes a capacitor 142 and a resistor 144. Conduction of the SCR 140 clamps the base electrode of a transistor 146 to ground. Clamping the base electrode of the transistor 146 to ground cuts off conduction through the transistor and the collector electrode voltage will be at the DC supply level. A DC voltage for biasing the various transistors of the circuit is supplied to a terminal 148 through a voltage regulator including a Zener diode 150 and a resistor 152. For the transistor 146, the DC voltage is supplied to the collector electrode through a resistor 154. The complete circuit for the transistor 146 includes a resistor 156 and a capacitor 158 in the base circuit connected to the SCR 140.

With the collector electrode of the transistor 146 at the supply level, a diode 160 will be forward biased thereby applying a positive voltage to the base electrode of a transistor 162. A positive voltage on the base electrode of the transistor 162 causes conduction between the collector and emitter electrodes, thereby clamping the collector electrode to ground. The complete circuit for the transistor 164 includes resistors 166, 168 and 170.

Accept and reject signals are generated at the collector electrode of the transistor 164 and the anode electrode of the SCR 140. In a typical arrangement, the collector electrode of the transistor 164 is connected to an indicator 176 that signals proper operation of a circuit under test. Likewise, in a typical embodiment, the anode electrode of the SCR 140 connects to a reject indicator 172 to indicate when a circuit under test does not conform to a desired operational specification.

Consider the conditions described above wherein the SCR 140 was made to conduct by a signal forward biasing the diode 138, then one side of the indicator 172 is clamped to ground through the SCR. Connecting one side of the indicator 172 to ground completes a circuit that includes a battery 174. Since the SCR 140 is gated on when the circuit under test does not operate per a design specification, turning on the indicator 172 signifies to an operator that the circuit is not functioning in accordance with an established specification. At the same time, the transistor 164 will be made nonconducting, thereby opening a circuit to the indicator 176 which additionally signifies to an operator that the circuit under test is not performing in accordance with a desired specification.

On the other hand, consider that the transistor 130 is conducting whenever the high-frequency pulse 42 is connected to the collector electrode of this transistor, then the diode 138 is back biased and the SCR 140 will be nonconducting. This results in the circuit for the indicator 174 being open and not energized. With the SCR 140 nonconducting, transistor 146 will be conducting thereby clamping the collector electrode thereof to ground. This back biases the diode 160 and the transistor 162 will be nonconducting. The nonconducting state of the transistor 162 causes the collector electrode thereof to be at the supply voltage, thereby turning on the transistor 164. Turning on the transistor 164 completes a circuit for the indicator 176 which signifies to an operator that the circuit under test is performing correctly. Thus, when a circuit is performing correctly, the lamp 176 will be energized and the lamp 172 will be deenergized. On the other hand, when a circuit is malfunctioning, the indicator 172 will be energized and the indicator 176 will be deenergized.

Figure 5:
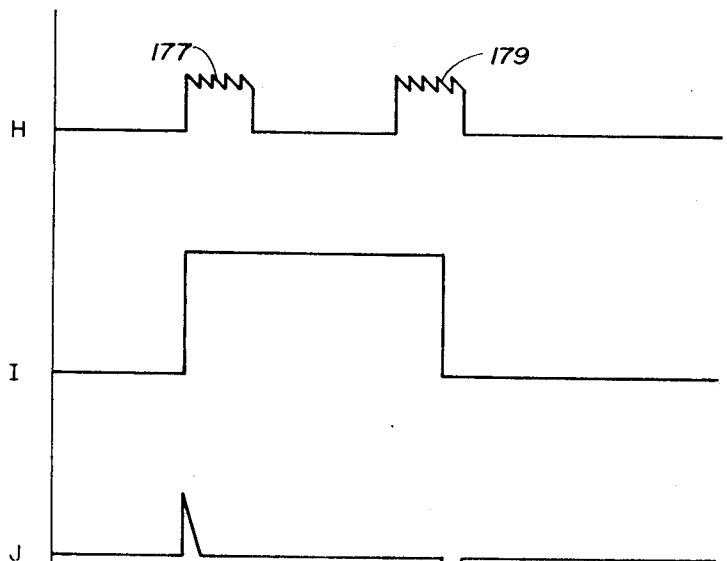
FIG. 5 is an illustration of waveforms appearing in the circuit of FIG. 4.

In addition to responding to the high-frequency portion of the check function signal, the circuit of FIG. 4 also responds to the low-frequency portions. For example, the pulses 177 and 179, as illustrated at FIG. 5H, are coupled to the base electrode of a transistor 178 through a resistor 180. The presence of a check pulse at the base electrode of the transistor 178 causes this transistor to be conducting, thereby clamping the collector electrode thereof to ground. The collector electrode of the transistor 178 connects to the output of the module 16 through a diode 182, a resistor 184, a capacitor 186, and the diode 134 to the terminal 132. In addition, the collector electrode of the transistor 178 connects to the collector electrode of a transistor 188 through a diode 190 and to the anode electrode of diode 192. Diode 192 also connects to the gate electrode of the SCR 140.

An output pulse, e.g., pulse 24, illustrated at FIG. 5I, from the module 16 is connected to the terminal 132 and forward biases the diode 134. The leading edge of a pulse at the terminal 132 is differentiated by the capacitor 186 to produce a positive spike, as illustrated at FIG. 5J. The leading edge spike of the pulse 24 connects to the base electrode of the transistor 188 through a resistor 194. Transistor 188, however, is in a conducting state and the leading edge spike merely drives the transistor further into conduction. At the same time, the leading edge spike forward biases the diode 182 and if the transistor 178 is nonconducting also forward biases the diode 192. Forward biasing the diode 192 triggers the SCR 140 into conduction thereby initiating operation of the transistors 146, 162 and 164, as explained previously.

If the transistor 178 was conducting due to the presence of the pulse 177, then the leading edge spike would not forward bias the diode 192 and the SCR 140 will be nonconducting, thereby indicating correct circuit operation. Thus, if the spike 177 is connected to the transistor 178 upon the occurrence of the leading edge of the pulse 24, the circuit is operating correctly and the SCR 140 remains nonconducting. On the other hand, if the leading edge of the spike 24 appears when the pulse 48 is not connected to the transistor 178, then the diode 192 becomes forward biased initiating the circuit reject operation, as described.

A trailing edge of a pulse connected to the terminal 132 is also differentiated by the capacity 186 to produce a negative pulse as illustrated at FIG. 5J. This negative pulse back biases the diode 182 and turns off the transistor 188, thereby allowing the collector electrode thereof to rise to the supply voltage through a resistor 196. A positive voltage at the collector electrode of the transistor 188 forward biases the diode 190 which in turn forward biases the diode 192, if the transistor 178 is nonconducting. If the diode 192 is forward biased at the same time as the pulse 179 connects to the transistor 178, the circuit 16 is operating incorrectly. This forward biases the SCR 140 to initiate energizing the indicator 172 and turning off the indicator 176. If a trailing edge pulse that turns off the transistor 188 occurs at a time when the transistor 178 is conducting, the diode 192 will be back-biased thereby indicating proper circuit operation.

Consider the pulses 24, 30 and 36 illustrated at FIG. 2D, pulse 24 produces leading and trailing edge spikes at the junction of resistors 184 and 194 at a time when the transistor 178 is conducting as a result of the pulses 48 and 50, respectively. Pulse 30 produces a leading edge spike that occurs when the transistor 178 is conducting as a result of the pulse 54. This and the previous two conditions indicate proper circuit operation and the SCR 140 will remain nonconducting. However, the trailing edge of the pulse 30 produces a negative spike at a time when the transistor 178 is nonconducting. This causes conduction through the SCR 140 which energizes the indicator 172 and turns off the indicator 176 to indicate to an operator that the circuit has malfunctioned. Pulse 36 also produces a leading edge spike which occurs when the transistor 178 is conducting and a trailing edge spike when the transistor 178 is nonconducting. The former situation indicates correct circuit operation and the latter incorrect circuit operation.

Although the present invention has been shown and illustrated in terms of a specific preferred embodiment, it will be apparent that changes and modifications are possible without departing from the spirit and scope of the invention as defined in the appended claims.

What is claimed is:

1. Apparatus for testing the operation of an automobile skid control module with test waveforms prerecorded on magnetic tape, comprising:
   a. magnetic tape playback means for converting one of the test waveforms into a frequency varying signal, and for converting another of the test waveforms into check function digital signals;
   b. coupling means for coupling said frequency varying signals to the input of said skid control module under test for producing digital output signals;
   c. signal converting means for characterizing the check function digital signals into a plurality of digital signals time synchronized to be present when the digital output signals appear from the skid control module;
   d. first logic gating means operatively responsive to one group of said digital signals and said digital output signals to produce a first reject signal when said one group of digital signals are not time synchronized with said digital output signals from said skid control module;
   e. second logic gating means operatively responsive to a second group of said digital signals and said digital output signals to produce a second reject signal when said digital output signals from said skid control module are not time synchronized with said second group of digital signals; and
   f. indicating means operatively responsive to the presence and absence of said first and second reject signals for indicating rejection and acceptance of the operating parameters of said skid control module under test.

2. Apparatus for testing the operation of an automobile skid control module as set forth in claim 1 wherein said check function signals are a plurality of signal groups, each group including two low-frequency signals with a high-frequency signal interposed therebetween, and said characterizing means includes a first filter for passing the low-frequency check signal and a second filter for passing the high-frequency check signal to produce said time synchronized digital signals.

3. Apparatus for testing the operation of an automobile skid control module as set forth in claim 2 wherein said indicating means includes ("go") "ACCEPTANCE" and ("no go") "REJECTION" indicator lamps.

4. Apparatus for testing the operation of an automobile skid control module as set forth in claim 3 wherein said second logic gating means includes a differentiator and rectifier for differentiating the leading and trailing edges of the digital output signals of said skid control module.

5. An electronic system for testing the operation of a digital electronic circuit utilizing stored prerecorded test waveforms, comprising in combination:
  a. reproducing means for converting one of said test waveforms into a frequency varying signal and another one of said test waveforms into groups of check function signals;
  b. coupling means for coupling said frequency varying signal to the input of said electronic circuit under test for producing digital output signals;
  c. first signal converting means for converting one group of said check function signals into a first group of digital signals selectively time synchronized with respect to selected parameters of the digital output signals of said digital electronic circuit under test;
  d. second signal converting means for converting another group of said check function signals into a second group of digital signals selectively time synchronized with respect to the presence of the digital output signals of said digital electronic circuit under test;
  e. first logic gating means operatively responsive to said first digital signals and said digital output signals of the electronic circuit under test for producing a first reject digital signal when selected parameters of said digital output signals are not selectively time synchronized with said first digital signals;
  f. second logic gating means operating responsive to said second digital signals and said digital output signals of the electronic circuit under test for producing a second reject digital signal when said digital output signals are not selectively time synchronized with said second digital signals; and
  g. indicating means operatively response to the presence and absence of said first and second reject signals for indicating rejection and acceptance of the operating parameters of said electronic circuit under test.

6. The electronic system of claim 5 wherein said test waveforms are prerecorded and stored on a magnetic tape, and said reproducing means is a magnetic tape player.

7. The electronic system of claim 5 wherein said selected parameters of said digital output signals are the leading and trailing edges thereof.

8. The electronic system of claim 5 wherein said first signal converting means includes a rectifier and filter of a selected frequency.

9. The electronic system of claim 5 wherein said second signal converting means includes a filter of a selected frequency.

10. The electronic system of claim 5 wherein said indicating means includes a reject circuit and indicator means for visually displaying ACCEPTANCE and REJECTION test results.

* * * * *